US009978146B2

United States Patent
Hedi et al.

(10) Patent No.: US 9,978,146 B2
(45) Date of Patent: May 22, 2018

(54) DATA-PROCESSING SYSTEM AND METHOD FOR CALIBRATION OF A VEHICLE SURROUND VIEW SYSTEM

(71) Applicant: XYLON d.o.o., Zagreb (HR)

(72) Inventors: Adam Hedi, Valpovo (HR); Marko Vidovic, Zagreb (HR); Ana Stanisic, Zagreb (HR); Anita Cazin, Kriz (HR); Eugen Gervais, Zagreb (HR); Tomislav Devcic, Zagreb (HR)

(*) Notice: Subject to any disclaimer, the term of this patent is extended or adjusted under 35 U.S.C. 154(b) by 53 days.

(21) Appl. No.: 15/114,547

(22) PCT Filed: Jan. 27, 2014

(86) PCT No.: PCT/HR2014/000003
§ 371 (c)(1),
(2) Date: Jul. 27, 2016

(87) PCT Pub. No.: WO2015/110847
PCT Pub. Date: Jul. 30, 2015

(65) Prior Publication Data
US 2016/0343136 A1 Nov. 24, 2016

(51) Int. Cl.
*H04N 19/43* (2014.01)
*G06T 7/00* (2017.01)
*G06T 7/80* (2017.01)

(52) U.S. Cl.
CPC ............ *G06T 7/0018* (2013.01); *G06T 7/80* (2017.01); *G06T 2207/10004* (2013.01); *G06T 2207/30208* (2013.01); *G06T 2207/30252* (2013.01)

(58) Field of Classification Search
None
See application file for complete search history.

(56) References Cited

U.S. PATENT DOCUMENTS

| 2012/0002057 | A1* | 1/2012 | Kakinami | G06T 7/002 348/187 |
| 2014/0168440 | A1* | 6/2014 | Tsuchiya | B60R 1/00 348/148 |
| 2015/0341629 | A1* | 11/2015 | Zeng | G06T 7/80 348/187 |

* cited by examiner

*Primary Examiner* — Eileen Adams
(74) *Attorney, Agent, or Firm* — Steven Rinehart

(57) ABSTRACT

A method of operating data-processing system for calibration of a vehicle surround view based on images captured of one or more 2D calibration patterns located at arbitrary positions in an overlapping field of view between two or more cameras fixed to the vehicle. The calibration patterns are arbitrary orientated in respect to the vehicle or other calibration patterns. Each calibration pattern is laying in the plane Z=0 on which the vehicle having surround view system is parked. The images of any calibration pattern j positioned in an overlapping field of view between two or more cameras are taken simultaneously establishing connected topological structure of the form:

. . . —camera i—pattern j—camera i'—pattern j^'—camera i"— . . .

The data-processing results with the corrected extrinsic camera i parameters $R_i, C_i$ for the vehicle coordinate system.

11 Claims, 1 Drawing Sheet

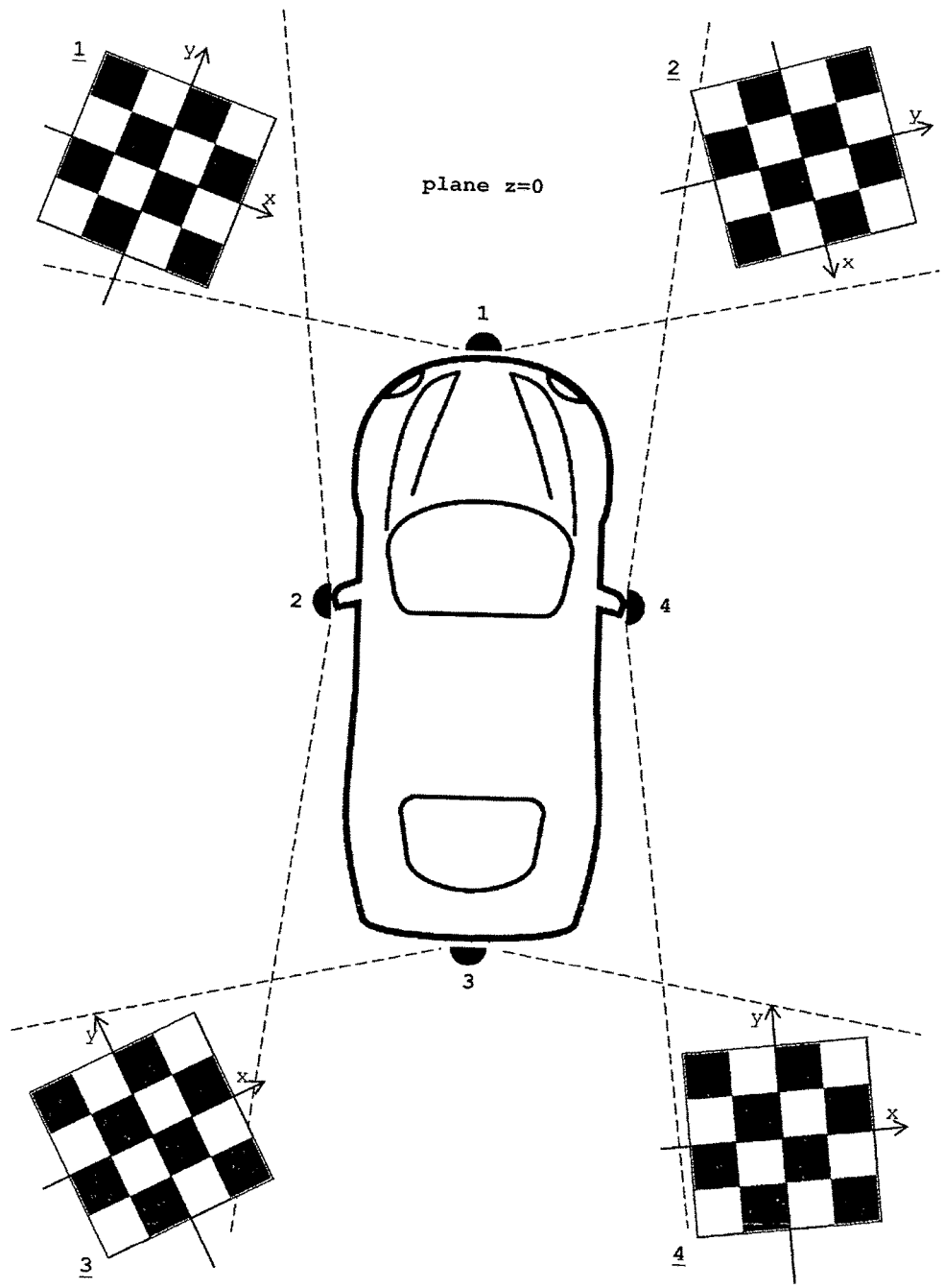

DATA-PROCESSING SYSTEM AND METHOD FOR CALIBRATION OF A VEHICLE SURROUND VIEW SYSTEM

TECHNICAL FIELD

The present invention relates to a method for calibration of a camera system comprising a plurality of cameras having a predetermined intrinsic calibration. The cameras are provided on an object such as vehicle and covering a surrounding perimeter of the object.

TECHNICAL PROBLEM

There is a growing demand for obtaining visual information about the objects surrounding the vehicle in real time. A vehicle driver often needs information beyond simple sensors for controlling the distance to the objects adjacent to the vehicle. Such information may be particularly useful in unknown, narrow or confined spaces, or in circumstances when visual assistance is needed for a precise maneuvering with very long vehicles. In such cases, it is often desired to provide a substantially overall picture presented on a control display, showing both the vehicle and its surroundings from a bird's eye perspective or any other desired perspective that can be calculated from the input data. Mentioned overview enables the driver to maneuver the vehicle precisely even in confined space and other problematic driving situations like passing by with the long vehicles.

Typically, at least two cameras are needed to obtain a view of the surrounding substantially close to 360° circumference. Such cameras may be provided in the side mirrors of the vehicle, and at the front and rear vehicle body parts. Data obtained from these cameras are processed by a data processing system. An important aspect of a camera system for providing such an overview picture is the calibration of the system, in particular the calibration of cameras extrinsic parameters that are necessary for precise image stitching. In spite of the precise mounting and initial calibration of extrinsic parameters by the manufacturers, the vehicle use and possible body repairs lead to the change of extrinsic camera parameters that distorts vehicle surround view due to the inaccurate image stitching.

It is known in the art that the calibration process is neither simple nor quick and requires advanced technical knowledge. In addition the calibration of the extrinsic camera parameters are performed usually within the specially equipped rooms that is far above the standards that is possible to find in an ordinary mechanic shop.

The present invention solves the problem of calibration of vehicle surround view systems, i.e. calibration of the extrinsic camera parameters, with an inexpensive hardware such as calibration pattern in the form of carpet and without advanced knowledge regarding the vehicle surround view. In addition, the procedure is possible to carry out with only one calibration pattern and in any ordinary mechanic shop having only flat floor. No additional calibration points are needed, and the system itself can be calibrated within a minute, without knowing relative position between the used carpet(s) or its relative position regarding the vehicle equipped with the surround view system.

Finally, it is possible to perform sequential taking of the calibration images from one or more calibration patterns if the mechanic shop has insufficient space as is the case for very long vehicles with mounted surround view system.

PREVIOUS STATE OF ART

We selected several patent and non-patent documents that are relevant for the relevant technical field. Document EP2523163A1 (Natroshvili K. and Gassmann B.) teaches about the method and program for calibrating a multicamera system. It comprises a plurality of cameras having a predetermined intrinsic calibration, the cameras being provided on a vehicle and covering a surrounding perimeter of the vehicle. The method comprising the steps of: positioning a set of markers spaced apart by known dimensions and located on a single plane in the surrounding perimeter of the object and in the field of view of a camera; then calculating extrinsic parameters of the camera from the respective set of markers for the camera; and repeating the steps for each of other cameras of the plurality of cameras. The essential difference between the disclosed invention and the cited related art EP2523163A1 is that later requires exact marker locations that make the procedure cumbersome for use within any mechanic shop.

Document EP2530647A1 (NATROSHVILI K. and SCHOLL K.-U.) teaches about the method of calibrating a vehicle vision system. A vehicle vision system comprises a plurality of image sensors which respectively capture images having a non-linear distortion. The image sensors, i.e. cameras, have overlapping fields of view. A position and orientation of the image sensor relative to the plurality of objects is determined based on the captured image. As mentioned in the paragraph [0010] of the document, the positions of the plurality of objects relative to each other are known; and these pre-determined relative positions may be used to determine the position and orientation of the image sensor and of the further image sensor relative to the plurality of objects. The plurality of objects may be dedicated markers, such as checkerboard patterns arranged in a trihedral arrangement. Paragraph [0010] renders the solution obvious to the skilled person in the art, and the need for knowing the exact mutual marker locations makes the procedure cumbersome for use within any mechanic shop.

Document US 2011/115922 A1 (SHIMIZU S.) teaches about the calibration apparatus and calibration method that executes a camera calibration for each of a plurality of cameras mounted on an object so that image capturing ranges of two of the plurality of cameras overlap each other. The said calibration apparatus includes an image obtaining unit configured to obtain first and second images captured by the two cameras, a temporary link structure forming unit configured to form a temporary link structure by using the first and second images including images of markers sets. Again the exact position of the markers renders the solution obvious to the skilled person in the art.

Document US 2010/194886 A1 (ASARI K., ISHII Y.) teaches about the camera calibration device that performs camera calibration for projecting a plurality of camera images from a plurality of cameras onto a predetermined surface to combine them on the basis of received results after calibration. Again the exact position of the markers renders the solution obvious to the skilled person in the art.

Document: Kannala J., Brandt S. S., "A Generic Camera Model and Calibration Method for Conventional, Wide-Angle, and Fish-Eye Lenses"; IEEE Transactions on Pattern Analysis and Machine Intelligence, vol. 28, no. 8, pp. 1335-1340, August, 2006; teaches about camera calibration method for fish-eye lens cameras that is based on viewing a planar calibration pattern. The experiments verify that the method is easy-to-use and provides a relatively high level of accuracy with circular control points. The proposed camera model is generic, easily expandable and suitable also for conventional cameras with narrow- or wide-angle lenses.

Document: Sorkine O., "Least-Squares Rigid Motion Using SVD"; Technical notes, 2009 teaches about the algorithm for computing the rigid transformation that aligns two sets of points. It can be obtained via:

http://igl.ethz.ch/projects/ARAP/svd_rot.pdf

SUMMARY OF INVENTION

The present invention disclose a method of operating data-processing system for calibration of a vehicle surround view system consisting of two or more wide-angle cameras i having already calibrated intrinsic camera parameters. The intrinsic camera parameters are stored and accessible by the data-processing system. Method of calibration comprising steps of:

(i) images capturing of one or more 2D calibration patterns $s_j$ located at arbitrary positions j in an overlapping field of view between two or more cameras fixed to the vehicle where the calibration patterns $s_j$ are arbitrary orientated in respect to the vehicle or other calibration patterns, where each calibration pattern is laying in the plane Z=0 on which the vehicle having surround view system is parked; the images of any calibration pattern j positioned in an overlapping field of view between two or more cameras are taken simultaneously by said cameras establishing connected topological structure of the form:

... —camera i—pattern j—camera i'—pattern j'—camera i"— ...

that encloses the vehicle;
(i) data collecting step;
(ii) calculating the set of extrinsic parameters $R_i^j$ and $C_i^j$;
(iii) mapping the visible $X_i^j$ marker points via camera i pertaining to each calibration patterns j to the common coordinate system selected for of each camera i;
(iv) merging all topologically connected set of cameras k to the camera i via connecting calibration patterns and performing the recalculation of the extrinsic camera k parameters $R_k, C_k$ and calibration pattern points visible from said cameras k into common coordinate system;
(v) optimizing the set of extrinsic camera parameters $R_i, C_i$ and corresponding calibration patterns displacement parameters $t_x^j, t_y^j, \alpha^j$ that enable accurate mapping of any 3D coordinate $X_j$ belonging to the calibration system j into 2D coordinate $x_i^j$ of the each camera i.

Finally, the extrinsic parameters $R_i, C_i$ of each camera i estimated in step (v) are recalculated to match the vehicle coordinate system.

The method is suitable where exact positions of the cameras in respect to the vehicle body are known from the manufacturer, and where such data are not provided. In the later case where such data are not provided, it is necessary to recalculate the ideal camera position regarding the vehicle body.

BRIEF DESCRIPTION OF THE DRAWING

FIG. 1 represents the most common situation where 4 cameras {1, 2, 3, 4} forms the vehicle surround view. Each cameras field of view is depicted via dotted line. One or more calibration patterns, here for simplicity represented in the form of chessboard carpets {1, 2, 3, 4}, are placed without any mutual correlation or correlation with the parked vehicle in the overlapping field of view between two vehicle cameras.

DETAILED DESCRIPTION OF INVENTION

The surround view implemented on a vehicle usually consists of several fish-eye or similar variant of wide-angle cameras mounted to body of said vehicle. The cameras are distributed in the way to satisfactory cover entire field of view. The image processing system further combine the cameras captured images via process known as image stitching, preferably in real time. For accurate image stitching it is necessary to calibrate each camera for intrinsic and extrinsic parameters.

Before the vehicle mounting, each camera is calibrated and intrinsic parameters for each camera are determined and stored. In spite of the precise mounting and initial calibration of extrinsic parameters, the vehicle use and possible body repairs lead to the change of extrinsic camera parameters that distorts vehicle surround view due to the inaccurate image stitching.

The present invention solves the problem of quick and accurate calibration of the vehicle surround view that is possible to perform in any mechanic shop with the minimum of technical equipment and without any expert knowledge. The only instrument needed for the calibration of the cameras extrinsic parameters are calibration patterns formed as the two dimensional structure, i.e. carpets, having easily detected and well defined geometrical patterns. No other information is needed such as vehicle position, relative calibration patterns position or relative calibration patterns orientation except that:

(1) during the calibration procedure one or more calibration patterns are lying in the same plane on which the vehicle is parked, and
(2) the calibration pattern in the form of carpet is placed in the overlapping field of view between two cameras and the pictures from said cameras are captured simultaneously.

The calibration procedure is independent of number of used cameras or calibration patterns. For the simplicity, the common situation with 4 cameras and 4 calibration patters will be discussed in detail without restrictions to the invention. The person skilled in the art will simply extend such calibration procedure to any number of cameras/calibration patterns.

Determination of Intrinsic Camera Parameters

The intrinsic camera parameters are obtained in the calibration process before the mounting into a vehicle surround-view system. Generally speaking, for any wide-angle camera it is possible to use so-called $p_6$ camera model described with the following set $\{k_1, k_2, k_3, k_4, u_0, v_0\}$ wherein $[u_0, v_0]^T$ represents principal point of camera's imager (CMOS, CCD or similar), and $\{k_1, k_2, k_3, k_4\}$—defines the wide-angle camera model, i.e. lens model.

The common calibration procedure usually assumes the ideal pinhole camera model where any 3D coordinates viewed by the camera is mapped using the said model into actual camera pixel $[x,y]^T$ defined by the transformation:

$$\begin{bmatrix} x \\ y \end{bmatrix} = \begin{bmatrix} u_0 \\ v_0 \end{bmatrix} + \begin{bmatrix} \hat{x} - \hat{w} \\ \hat{y} - \hat{h} \end{bmatrix} \cdot k(\theta) \quad (1)$$

wherein, $[\hat{x}, \hat{y}]^T$ stands for the ideal pinhole camera model projection coordinate where $[\hat{w}, \hat{h}]$ defines half of the width and height of pinhole camera, and $\theta_{max}$ defines the desired horizontal field of view. The relations among the parameters are known in the art and defined to read:

$$k(\theta) = (k_1 \theta + k_2 \theta^3 + k_3 \theta^5 + k_4 \theta^7)/\tan(\theta) \quad (2)$$

$$\theta = \mathrm{atan}\left(s \cdot \sqrt{(\hat{x}-\hat{w})^2 + (\hat{y}-\hat{h})^2}\right)$$

$$s = \tan\left(\frac{\theta_{max}}{\hat{w}}\right)$$

The final result for each camera i is the intrinsic matrix of ideal pinhole camera:

$$A_i = \begin{bmatrix} 1/s & 0 & \hat{w} \\ 0 & 1/s & \hat{h} \\ 0 & 0 & 1 \end{bmatrix} \quad (3)$$

After successfully completed calibration procedure the computed camera parameters are stored inside of each camera, for instance in corresponding on-board flash memory.

The procedure regarding intrinsic and extrinsic camera parameters estimation is well known in the art. For instance, the procedure described above can be found in conference proceeding:

Hedi A., Loncaric S., "System for Vehicle Surround View", 10th IFAC Symposium on Robot Control 2012, IFAC SYROCO 2012, Dubrovnik; ISBN: 978-1-62276-367-2.

or more elaborated with comparison among the different lens models:

Kannala J., Brandt S. S., "A Generic Camera Model and Calibration Method for Conventional, Wide-Angle, and Fish-Eye Lenses"; IEEE Transactions on Pattern Analysis and Machine Intelligence, vol. 28, no. 8, pp. 1335-1340, August, 2006.

The latter article introduces more convenient notation for the cameras having $\theta_{max} > 75°$ where the intrinsic camera parameters are slightly rewritten. The relations (1) and (2) which maps any 3D point $X=[X,Y,Z]^T$ associated with the camera coordinate into actual camera pixel $x=[x,y]^T$ are rewritten to read:

$$\begin{bmatrix} x \\ y \end{bmatrix} = \begin{bmatrix} u_0 \\ v_0 \end{bmatrix} + \begin{bmatrix} r(\theta)\cos(\varphi)/m_u \\ r(\theta)\sin(\varphi)/m_v \end{bmatrix} \quad (1')$$

where parameters $\theta$, $\varphi$, and $r(\theta)$ are defined via relation (2'):

$$\varphi = a\tan 2(Y,X)$$

$$\theta = a\tan 2(\sqrt{X^2+Y^2}, Z) \quad (2')$$

$$r(\theta) = k_1\theta + k_2\theta^3 + k_3\theta^5 + k_4\theta^7 + k_5\theta^9 + \ldots$$

Parameters $m_u$ and $m_v$ represent number of camera pixels per unit distance in horizontal and vertical direction. The set of $k_j$ parameters defining $r(\theta)$ in (2') depends on desired accuracy and authors confirmed that 5 parameters are generally sufficient for adequate $r(\theta)$ definition.

For the person skilled in the art it is evident that using the matrix $A_i$ for mapping 3D point $X=[X,Y,Z]^T$ into actual camera pixel $x=[x,y]^T$ or projections defined via (1') and (2') above for the same mapping is equivalent from the computational point of view, if the reverse transformation is not sought.

In this text when the $A_i$ matrix is mentioned we assume that it represents well defined transformation from 3D space to 2D space characterized by pre-calibrated intrinsic camera parameters. Considering that reverse transformation is unimportant for the invention the notation with $A_i$ matrix will be preserved for simplicity.

Determination of Extrinsic Camera Parameters

The determination of extrinsic camera parameters is the procedure that results with the geometric relation between the real world 3D coordinate system and the camera 3D system. The rotational matrix $R_i^j$ and translation vector $t_i^j$ are defined in well known manner in the art for the pinhole camera model:

$$x_i^j = A_i[R_i^j | t_i^j]X_i^j = \quad (4)$$

$$A_i[R_i^j | t_i^j]\begin{bmatrix} X^j \\ Y^j \\ 0 \\ 1 \end{bmatrix} = A_i \begin{bmatrix} 1 & 0 & 0 & 0 \\ 0 & 1 & 0 & 0 \\ 0 & 0 & 1 & 0 \end{bmatrix}\begin{bmatrix} R_i^j & t_i^j \\ 0 & 1 \end{bmatrix}\begin{bmatrix} X^j \\ Y^j \\ 0 \\ 1 \end{bmatrix} = H_i^j \begin{bmatrix} X^j \\ Y^j \\ 1 \end{bmatrix}$$

mapping the 3D coordinate $X_i^j$ belonging to any of the marker coordinate system j into the 2D coordinate $x_i^j$ captured by the camera i. Since each matrix $A_i$ is already defined by the installed cameras into vehicle the parameters $R_i^j$ and $t_i^j$ should be estimated. Each camera in the system is parameterized using 6 parameters; 3 parameters for relative position and 3 parameters for orientation, i.e. the rotation matrix is parameterized using the Euler angles.

For the $R_i^j$ and $t_i^j$ assessment it is necessary to locate at least four distinctive points—3D marker coordinates—pertaining to the calibration pattern j visible by the camera i. This feature extraction depends of used calibration pattern and can be hard due to intensive geometrical distortions induced by fish-eye or wide-angle lens. Experimenting with the various types of markers the chessboard markers are found suitable for the desired task. The pattern recognition procedure implemented to the automatic detection of chessboard markers is known in the art. The similar approach is described in: Scharfenberger N. C., "Panoramic Vision for Automotive Applications: From Image Rectification to Ambiance Monitoring and Driver Body Height Estimation", PhD. Thesis, Technischen Universitat MUnchen 2010; http://mediatum.ub.tum.de/doc/1002339/1002339.pdf In the present invention the chessboard markers/carpets are used but any other suitable calibration pattern can be equally used. The types of used markers or their possible combinations are arbitrary, and the calibration procedure algorithm per se does not depend on used markers. What is necessary to be precisely known is the position of the extracted marker coordinates in the coordinate system j that is arbitrary oriented regarding to other chessboard markers placed around the vehicle and vehicle's orientation per se. The extracted set of marker points has the form $[X^j, Y^j, 0, 1]^T$ assuming that $Z^j=0$ for each point. Using homography $H_i^j$ we can determine extrinsic parameters $R_i^j$ and $t_i^j$ in the following manner:

$$R_i^j = \{r_{1i}^j, r_{2i}^j, r_{3i}^j\} \quad (5)$$

where:

$$r_{1i}^j = \lambda_i^j A_i^{-1} h_{1i}^j$$

$$r_{2i}^j = \lambda_i^j A_i^{-1} h_{2i}^j$$

$$r_{3i}^j = r_{1i}^j \times r_{2i}^j \quad (6)$$

and $t^i$ is defined to read:

$$t_i^j = \lambda^j A_i^{j-1} h_3^j \qquad (7)$$

Elements $h_{1i}^j$, $h_{2i}^j$, $h_{3i}^j$ are columns of the corresponding matrix $H_i^j$. Scalar $\lambda^j$ is defined as:

$$\lambda^j = 1/\|A_i^{j-1} h_{1i}^j\| = 1/\|A_i^{j-1} h_{2i}^j\| \qquad (8)$$

where the matrix norm is of the Frobenious type.

The result of calculated homography $H_i^j$ gives determined $R_i^j$ and $t_i^j$.

Additionally, it is necessary to check if camera i center $C_i^j = -R_i^{j^T} t_i^j$ calculated in respect to the calibration pattern j has positive third coordinate. If this is not the case we have to flip cameras position with respect to ground plane via following set of transformations:

$$r_{1i}^j = -r_{1i}^j \; r_{2i}^j = -r_{2i}^j \; t_{1i}^j = -t_{1i}^j \text{ and } r_{3i}^j = r_{1i}^j \times r_{2i}^j \qquad (9)$$

Finally, we have $R_i^j$, $t_i^j = -R_i^j C_i^j$ properly defined.

Any other suitable extrinsic camera parameters calibration technique may be equally used if results with the well defined parameters $R_i^j$ and $t_i^j$. It has to be emphasized that determination of extrinsic and intrinsic camera parameters forms the prerequisite for solving the main technical problem of the invention—quick and accurate calibration of the vehicle surround view. The determinations of intrinsic and extrinsic parameters are well known in the art and described elsewhere, for instance in: Hartley R., Zisserman A., "Multiple View Geometry in Computer Vision", Cambridge University Press 2000, 2003.

Calibration Procedure

Calibration procedure is the procedure for correcting extrinsic camera i parameters $R_i$ and $C_i$ that is later use for generating surround view images. The intension of the invention is to be simple to operate, quick and to be used without expert knowledge or sophisticated calibration equipment. In order to achieve the mentioned task the system is designed in the way that the responsible person for the calibration has to distribute calibration patterns around the mechanical shop floor where vehicle is parked within the cameras overlapping field of view.

The most convenient procedure is depicted on the FIG. 1 where each calibration pattern is seen by pairs of cameras and where enough number of calibration patterns in form of carpets is distributed around vehicle. With such calibration set-up it is possible to take instantaneously all needed images used in the calibration procedure.

However, considering the fact that the vehicle is not moving, the procedure is possible to carry out sequentially with only one calibration pattern in the form of chessboard carpet. Once the vehicle is parked also means that vehicle body mounted cameras are stationary in respect to the mechanical shop floor. The calibration carpet is positioned relative to the vehicle in the way that is seen by two different cameras simultaneously. Once carpet image being taken by the said cameras, the carpet is relocated to the next overlapping cameras field of view and new set of images are taken. Effectively the final result is the same as in the case where many carpets being used in the same time, but the procedure last longer without losing the accuracy. However, later is important if the calibration procedure is carried out on a very long vehicle.

Certainly is hard to find ideal space for carrying calibration procedure for such vehicle taking all necessary cameras images instantaneously. So it is very convenient that the image capturing is executed in steps, and this is an advantage of the described calibration system.

For the calibration procedure, it is necessary to establish a chain of alternating series of cameras and calibration carpets images that totally surround the vehicle with surround-view that has to be calibrated. Referring to the FIG. 1, the calibration chain reads: 1-1-2-4-4-3-3-2-1 where "underscored" numbers refers to already taken images of calibration patterns by the cameras assigned by ordinary numbers. As explained above, used chessboard carpets can be effectively replaced in theory with only one carpet displaced on several locations around the vehicle. In other words, 1-2-4 means that cameras 1 and 4, i.e. front vehicle camera 1 and right vehicle camera 4 in our example, picked the image from the carpet 2 in the same instant of time. Other topological structures such as branched chains are also useful in the process when a camera is capable to observe more than 2 carpets. The skilful person in the art will immediately recognize the technical possibility of such situation for possible calibration error corrections that we will not elaborate here.

The calibration algorithm is divided in several steps. The calibration algorithm is executed by the data operating system that can operate as the part of the vehicle surround-view system, or being separated from the vehicle with the ability to export data to the vehicle surround-view system. In the rest of the text when carpet j is mentioned the number associated with the letter j refers to the position of the calibration pattern from which the image is taken by the corresponding cameras.

Step 1

Step 1 is basically a data collection step. It is necessary that data operating system loads all $A_i$ intrinsic camera parameters; where i is 1, . . . , 4 for the case depicted by the FIG. 1; where meaning of $A_i$ is extended beyond the extrinsic matrix as explained before in the section Determination of Intrinsic Camera Parameters.

Next, the data operating system has to detect set of markers $x_i^j$ from images captured by each camera i from two or more calibration patterns $s_j$. Set of detected values $x_i^j$ are 2D points received by the corresponding camera i that belongs to the carpet j, i.e. calibration patterns placed at position j. The detection can be performed via any suitable technique already described in the related art, as explained before in the section Determination of Extrinsic Camera Parameters.

For each calibration pattern $s_j$ we load a set of $X^j$ markers within the data processing system, i.e. 3D points located within the coordinate system of the corresponding carpet j pertaining to the 2D values already detected by the corresponding cameras images captured by cameras mounted on a vehicle.

With the last action all necessary data is stored into data operating system and the carpets are no longer needed.

Step 2

Step 2 is directed to the calculation of extrinsic parameters $R_i^j$, $t_i^j = -R_i^j C_i^j$ that are necessary to directly connect detected $x_i^j$ markers and corresponding 3D values $X^j$ of each visible calibration pattern j from the camera i bearing in mind that intrinsic camera parameters $A_i$ are already known. We rewrite formula (4) for the parameter $t_i^j = -R_i^j C_i^j$:

$$x_i^j = A_i[R_i^j | -R_i^j C_i^j] X^j \qquad (10)$$

Referring to the system already depicted on FIG. 1, the step 2 will result with the following set of $R_i^j, C_i^j$ parameters for each camera i:

Camera 1: $\{R_1^1, C_1^1, R_1^2, C_1^2\}$
Camera 2: $\{R_2^1, C_2^1, R_2^3, C_2^3\}$ Camera 3: $\{R_3^3, C_3^3; R_3^4, C_3^4\}$
Camera 4: $\{R_4^2, C_4^2; R_4^4, C_4^4\}$ For instance, using the equation (10) in the present example we obtain for the carpet j=3 two corresponding relations, referring to the camera/carpet configuration from FIG. 1:

$$x_2^3 = A_2[R_2^3 | -R_2^3 C_2^3] X_2^3 \text{ and } x_3^2 = A_3[R_3^3 | -R_3^3 C_3^3] \atop x_3^2 \quad (11)$$

Step 3

The step 3 is dedicated to transformation into common coordinate system of each camera i, more precisely to one of the coordinate system associated with the j carpet visible by the same camera i. If we imagine that some camera i is looking onto several carpets j the algorithm decides to pronounce some of the j system as the common coordinate system for all other carpets j visible from the camera i.

In the example depicted by the FIG. 1, camera 1 is looking onto carpet 1 and carpet 2 simultaneously. We may therefore choose j=1 or j=2 as the common system. It is possible to identify at least one so called $1^{st}$ coordinate system for each camera i and to build a corresponding lookup table; for instance:

| i | $1^{st}$ |
|---|---|
| 1 | 1 |
| 2 | 1 |
| 3 | 3 |
| 4 | 2 | or

| i | $1^{st}$ |
|---|---|
| 1 | 2 |
| 2 | 1 |
| 3 | 3 |
| 4 | 3 | or

| i | $1^{st}$ |
|---|---|
| 1 | 2 |
| 2 | 3 |
| 3 | 4 |
| 4 | 4 | or . . . .

Each lookup table above is equally good for the transformation into a common camera coordinate system. For each camera i it is convenient to assign a pair of extrinsic parameters $R_i^j$, $C_i^j$ associated with the already chosen $1^{st}$ system according to the lookup table as $R_i = R_i^{1st}$, $C_i = C_i^{1st}$.

Now, for each other carpet j visible from camera i that is different from the chosen $1^{st}$ carpet we perform the following transformation:

$$X_i^j \leftarrow T X_i^j \text{ where } j \neq 1st \quad (12)$$

and transformation matrix T is defined to be:

$$T = \begin{bmatrix} R_i & -R_i C_i \\ 0 \ 0 \ 0 & 1 \end{bmatrix}^{-1} \begin{bmatrix} R_i^j & -R_i^j C_i^j \\ 0 \ 0 \ 0 & 1 \end{bmatrix} \quad (13)$$

The sign ← has meaning that for each $X_i^j$ we recalculate transformation $X_i^j$, each newly obtained value is temporally stored and once the operation is performed for each i and j index the temporally stored values are stored to $X_i^j$.

Here we used the fact that some 3D coordinate $X_i$ from the $1^{st}$ system of camera i may be projected to the camera i to read:

$$\begin{bmatrix} R_i & -R_i C_i \\ 0 \ 0 \ 0 & 1 \end{bmatrix} X_i = \begin{bmatrix} R_i & -R_i C_i \\ 0 \ 0 \ 0 & 1 \end{bmatrix} T X_i^j \quad (14)$$

where $X_i^j$ corresponds to the identical 3D point but expressed in coordinate system associated to the carpet j. Matrix T is a standard transformation matrix between two coordinate systems and j≠1st. Inserting the T matrix from the equation (13) into (14) justifies equality sign.

The result of the step 3 is that for each camera $c_i$ exist only one set of corresponding $R_i, C_i$ and all other data $X_i^j$ for each carpet j visible from the said same camera i now belongs to the common coordinate system defined by the lookup table for the camera Step 4

The step 4 is dedicated to transformation into common coordinate system that will join the cameras by the common calibration pattern(s) visible from adjacent cameras.

We may start the step 4 with any camera. However it is convenient to start with camera i=1. This camera is pushed to queue and the action that follows should be repeated while said queue is not empty.

The topmost camera c is popped from the queue, and we do several loops:

for each carpet s visible from the said camera c we are looking for the set of cameras k, c≠k, from which the same set of carpets s is visible and, what is important, where camera k is not already processed. That enables us to explore all connections within the given topological structure.

In our example, the topological structure reads:

1-1-2-❸-4-3-3-2-1

For instance, if c=4 is the topmost camera, the visible carpets are 2 and 4 which enable two types of connection; 1-2-❸ where k=1 and ❸-4-4-3 where k=3.

Using the rigid transformation it is possible to directly merge each camera c with camera k, via above mentioned carpets s. The goal is to find rotational matrix R and translation matrix T that connect the same set of points $X_k^s$ and $X_c^s$ via relation $X_c^s = R X_k^s + T$ for each camera k. The suitable algorithm is known in the art, we may use one described in: Sorkine O., "Least-Squares Rigid Motion Using SVD"; Technical notes, 2009.

Estimated pair R, T defines transformation $X_k^s \rightarrow X_c^s$ that enable us to recalculate all parameters and markers visible from the camera k. Let the q denotes all markers visible from the camera k including those from the connecting carpet s; we may recalculate each $X_k^q$:

$$X_k^q \leftarrow \begin{bmatrix} R & T \\ 0 \ 0 \ 0 & 1 \end{bmatrix} X_k^q \quad (15)$$

Moreover we calculate transformation matrix:

$$M = \begin{bmatrix} R_k & -R_k C_k \\ 0\ 0\ 0 & 1 \end{bmatrix} \cdot \begin{bmatrix} R & T \\ 0\ 0\ 0 & 1 \end{bmatrix}^{-1} \quad (16)$$

to transform each extrinsic camera k parameters $R_k, C_k$:

$$R_k \rightarrow M(1:3,1:3)$$

$$C_k \leftarrow -R_k^{-1} M(1:3,4) \quad (17)$$

with the caution that firstly $R_k$ is calculated and that values are used for calculating updated values of $C_k$.

Finally, all the cameras k are pushed to queue top and the procedure starts from the beginning and all parameters are stored for the said case, i.e. some particular camera c.

REMARK: With the performed operation, for all cameras connecting camera i via the same carpet s all corresponding 3D marker coordinates $X_k^q$ have been recalculated for the coordinate system corresponding to the coordinate system common for the camera i, more precisely to coordinate system assigned to be $1^{st}$ for the camera i. In addition, corresponding extrinsic parameters of the mentioned set of cameras k are recalculated for the same coordinate system.

The step 4 is finished when all topological interconnections are evaluated.

Step 5

The step 5 is dedicated to fine tuning of each visible carpet s parameters and all camera parameters $R_i, C_i$. For each carpet it is possible to use the information from the cameras directly seeing said carpet obtained in step 4 recalculated for the common coordinate system. Referring to the example depicted on FIG. 1, we have the set of data $X^j$:

Carpet 1: $X^1 = X_1^1$ or $X^1 = X_2^1$
Carpet 2: $X^2 = X_1^2$ or $X^2 = X_4^2$
Carpet 3: $X^3 = X_2^3$ or $X^3 = X_3^3$
Carpet 4: $X^4 = X_4^4$ or $X^4 = X_3^4$ It is possible to think about the each carpet coordinate system j as being slightly rotated around the corresponding Z axis for the angle $\alpha^j$ and slightly translated in the Z=0 plane by the vector $[t_x^j, t_y^j]$, from the optimal position.

For the computational reason, the data $X^j$ are corrected in relation for the centroid $O^j$:

$$X^j \leftarrow X^j - O^j \quad (18)$$

where centroid $O^j$ is calculated in respect to all $X^j$ belonging to the same carpet j. Fine tuning of some marker 3D position $X^j$ on the carpet j can be written:

$$X^j \leftarrow \begin{bmatrix} & & & t_x^j \\ Rot\ Z(\alpha^j) & & & t_y^j \\ & & & 0 \\ 0 & 0 & 0 & 1 \end{bmatrix} X^j \quad (19)$$

or rewriting Rot $Z(\alpha^j)$ in relation (19):

$$X^j \leftarrow \begin{bmatrix} \cos(\alpha^j) & -\sin(\alpha^j) & 0 & t_x^j \\ \sin(\alpha^j) & \cos(\alpha^j) & 0 & t_y^j \\ 0 & 0 & 0 & 1 \end{bmatrix} X^j \quad (20)$$

where initially $\alpha^j$ is set to zero, and coincides with the calculated centroid $O^j$.

To obtain corrected $R_i, C_i$ for each camera i and $t_x^j, t_y^j$ and $\alpha^j$ parameters for each carpet j we perform nonlinear optimization:

$$E = \arg\min(\tilde{x}_i^j - x_i^j)^2 \quad (21)$$

where argmin minimization is performed over all parameters $R_i, C_i, t_x^j, t_y^j, \alpha^j$ for each camera i and carpet j. In our example that refers to 36 independent parameters; 12 parameters for the four carpets and additional 24 parameters for four cameras.

Values $\tilde{x}_i^j$ correspond to measured values observed by the cameras and values $x_i^j$ to the modeled values. Combining the equation (10) and (20) the model reads:

$$x_i^j = A_i[R_i | -R_i C_i] X^j = A_i[R_i | -R_i C_i] \begin{bmatrix} \cos(\alpha^j) & -\sin(\alpha^j) & 0 & t_x^j \\ \sin(\alpha^j) & \cos(\alpha^j) & 0 & t_y^j \\ 0 & 0 & 0 & 1 \end{bmatrix} X^j \quad (22)$$

For each selected camera i the optimization is performed for each carpet s visible by the said camera where $X^j$ data belongs to the 3D data obtained from the carpet s.

Step 5 ends with the set of parameters $R_i, C_i, t_x^j, t_y^j, \alpha^j$ that enables accurate mapping of 3D coordinate $X^j$ belonging to the carpet system s into 2D coordinate $x_i^j$ of the each camera i.

Step 6

It is necessary to merge all 3D coordinate systems s already optimized into one common vehicle coordinate system with the origin in the vehicle center. In practice, two possibilities might arise; first the most common one when the exact position of each camera i in respect to the vehicle body is known according to the data provided by the vehicle manufacturer. Second one is that vehicle cameras positions are undetermined. However, later on is possible to resolve by defining vector connecting front and rear camera and the point representing half of the said distance to be considered a vehicle center.

Camera centers $C_i$ are determined in step 5. If no mounting position available, we define center of the vehicle as the midpoint: $centerC = (C_{front} + C_{rear})/2$ measured in respect. For each camera i we calculate ideal mounting position $\tilde{C}_i$ as the ideal mounting position in respect of the centerC to read $\tilde{C}_i = C_i - centerC$ where the relative rotation $\beta$ of the vector connecting front and rear camera and vehicle is calculated from: $\beta = a\tan 2(\tilde{C}_{front}(x), \tilde{C}_{front}(y))$. We define matrix $$B = rotZ\left(-\left(\beta - \frac{\pi}{2}\right)\right)$$

which role is to rectify front-rear vector into vehicle y axis direction. Now, we may re-calculate $\tilde{C}_i$ positions for each camera i to read $\tilde{C}_i \leftarrow B\tilde{C}_i$.

In case that exact camera mounting positions are known on the vehicle body then $\tilde{C}_i$ are defined.

Having well defined $\tilde{C}_i$ we may now compute rigid transformation parameters $R_V, T_V$ that maps set of points $\tilde{C}_i$ to the corresponding set of points $C_i$ via relation $C_i = R_V \tilde{C}_i + T_V$. Constructing the matrix where input parameters are $R_i, C_i$ parameters from the step 5 and newly established parameters $R_V, T_V$ $$M_i = \begin{bmatrix} R_i & -R_iC_i \\ 0\ 0\ 0 & 1 \end{bmatrix} \cdot \begin{bmatrix} R_V & T_V \\ 0\ 0\ 0 & 1 \end{bmatrix} \quad (23)$$

it is possible to correct $R_i$ and $C_i$ of each camera i to be adjusted for the vehicle coordinate system:

$$R_i \leftarrow M_i(1:3,1:3)$$

$$C_i \leftarrow -R_i^{-1}M_i(1:3,4) \quad (24)$$

By this step the technical problem is completely solved; extrinsic parameters of each camera are calibrated and the values $R_i, C_i$ are stored into the vehicle surround view. In spite the limitations, standard FPGA-based hardware is capable to perform the calculations specified by the step 1-step 6 in less then 60 seconds for the example shown on the FIG. 1.

During the visualization that includes various image processing procedures, any 3D coordinate $X_i$ mapped to camera i coordinate system is recalculated into vehicle system to read:

$$X_i \leftarrow \begin{bmatrix} R_V & T_V \\ 0\ 0\ 0 & 1 \end{bmatrix}^{-1} X_i. \quad (25)$$

Transformation (25) enables generation of any other desired projections such as bird-eye view or similar in the manner already known in the art.

INDUSTRIAL APPLICATION

The industrial application of the present invention is evident. Beside the use for re-calibration of a vehicle surround view, the present invention is useful for the re-calibration of any surround camera system where the image is obtained via "image stitching" captured from two or more cameras.

REFERENCES $c_i$—camera
$s_j$—calibration pattern (carpet)
$X^j$—3D marker coordinate of the calibration pattern j
$x_i^j$—2D marker coordinate observed from the calibration pattern j in the camera i
$R_i$—camera i rotation matrix
$C_i$—camera i center
$A_i$—defined mapping from 3D camera coordinate system into observed 2D camera image

The invention claimed is:

1. A method of operating data-processing system for calibration of a vehicle surround view system consisting of two or more wide-angle cameras $c_i$ having already calibrated intrinsic camera parameters and stored to be accessible by the data-processing system, where said method comprising steps of:
   (i) images capturing of one or more 2D calibration patterns $s_j$ located at arbitrary positions j in an overlapping field of view between two or more cameras fixed to the vehicle where the calibration patterns $s_j$ are arbitrary orientated in respect to the vehicle or other calibration patterns, where each calibration pattern is laying in the plane Z=0 on which the vehicle having surround view system is parked; the images of any calibration pattern j positioned in an overlapping field of view between two or more cameras are taken simultaneously by said cameras establishing connected topological structure of the form:
   ...—camera i—pattern j—camera i'—pattern j'—camera i''— ...
   that encloses the vehicle;
   (ii) data collecting step that includes loading of intrinsic camera parameters, loading of detected 2D marker coordinates $x_i^j$ received from each camera i from the calibration patterns located at the positions j, and loading of the 3D coordinates $X^j$ associated with the already located marker points from the calibration pattern at the position j expressed in the coordinate system affixed to the calibration pattern j; all parameters being stored to said data-processing system;
   (iii) calculating the set of extrinsic parameters $R_i^j$ and $C_i^j$ referring to the camera i and calculated for the coordinate system j associated with the corresponding calibration pattern, where said $R_i^j$ and $C_i^j$ are used to map 3D coordinate associated with the marker point $X_i^j$ into 2D camera i point $x_i^j$ via intrinsic camera parameters;
   (iv) for each camera i observing the set of calibration patterns j one coordinate system is pronounced as the common and corresponding extrinsic camera i parameters are assigned as $R_i$ and $C_i$, and all other $X_i^j$ data corresponding to the camera i and belonging to the different systems j are recalculated via relations:

$$X_i^j \leftarrow TX_i^j, \text{ where } j \neq \text{common}$$

$$T = \begin{bmatrix} R_i & -R_iC_i \\ 0\ 0\ 0 & 1 \end{bmatrix}^{-1} \begin{bmatrix} R_i^j & -R_i^jC_i^j \\ 0\ 0\ 0 & 1 \end{bmatrix}$$

(v) for each camera i, the data processing system locate within the topological structure set of cameras k connected with the said camera i via calibration patterns s and recalculate the corresponding extrinsic parameters $R_k, C_k$ and all markers q visible from the camera k including those visible from said calibration pattern s, $X_k^q$ via transformation:

$$X_k^q \leftarrow \begin{bmatrix} R & T \\ 0\ 0\ 0 & 1 \end{bmatrix} X_k^q$$

$$M = \begin{bmatrix} R_k & -R_kC_k \\ 0\ 0\ 0 & 1 \end{bmatrix} \cdot \begin{bmatrix} R & T \\ 0\ 0\ 0 & 1 \end{bmatrix}^{-1}$$

$$R_k \leftarrow M(1:3, 1:3)$$

$$C_k \leftarrow -R_k^{-1}M(1:3, 4)$$

where R and T parameters are defined as rigid body transformation connecting two set of data $X_k^s \rightarrow X_c^s$ via relation $X_c^s = RX_k^s + T$;
   (vi) the nonlinear optimization is performed for each camera i by minimizing the relation $(\tilde{x}_i^j - x_i^j)^2$; where $\tilde{x}_i^j$ are measured values and $x_i^j$ modeled values in respect to the observed calibration pattern j assuming that each modeled calibration pattern is slightly displaced in the Z=0 plane for the vector $[t_x^j, t_y^j]$ and rotated around the Z axis for $\alpha^j$, where step ends with the set of parameters $R_i, C_i, t_x^j, t_y^j, \alpha^j$ that enables accurate mapping of 3D coordinate $X^j$ belonging to the calibration system j into 2D coordinate $x_i^j$ of the each camera i.

2. The method of operating data-processing system as in claim 1, wherein the extrinsic parameters $R_i, C_i$ estimated in step (vi) of each camera i are recalculated to match the vehicle coordinate system:
  (i) by using the exact position $\tilde{C}_i$ of each camera i in respect to the vehicle body provided by the manufacturer, or
  (ii) by recalculating the ideal position $\tilde{C}_i$ of each camera i assuming the vehicle center is defined as the midpoint between front and rear camera: $centerC=(C_{front}+C_{rear})/2$, recalculating the $\tilde{C}_i$ to read $\tilde{C}_i=C_i-centerC$, and performing mapping: $\tilde{C}_i \leftarrow B\tilde{C}_i$ where $\beta=a\tan 2(\tilde{C}_{front}(x),\tilde{C}_{front}(y))$ and matrix $$B = rotZ\left(-\left(\beta - \frac{\pi}{2}\right)\right);$$

and performing rigid transformation for determining parameters $R_V, T_V$ that maps set of points $\tilde{C}_i$ from (i) or (ii) to the corresponding set of points $C_i$ via relation $C_i = R_V \tilde{C}_i + T_V$; and $$R_i \leftarrow M_i(1:3, 1:3)$$
$$C_i \leftarrow -R_i^{-1} M_i(1:3, 4)$$

where $$M_i = \begin{bmatrix} R_i & -R_i C_i \\ 0\ 0\ 0 & 1 \end{bmatrix} \cdot \begin{bmatrix} R_V & T_V \\ 0\ 0\ 0 & 1 \end{bmatrix}.$$

3. The method of operating data-processing system in accordance with claim 1, wherein used calibration pattern is in the form of checkerboard calibration pattern.

4. The method of operating data-processing system in accordance with claim 1, wherein only one calibration pattern is used to perform multi camera calibration.

5. The method of operating data-processing system in accordance with claim 1, wherein the wide-angle cameras are equipped with fish-eye lenses.

6. A data-processing system for calibration of a vehicle surround view system comprising means for carrying out the method of claim 1.

7. The data-processing systems as in claim 6 forming integral part of a vehicle surround view system.

8. A data-processing system for calibration of a vehicle surround view system comprising means for carrying out the method of claim 2.

9. A data-processing system for calibration of a vehicle surround view system comprising means for carrying out the method of claim 3.

10. A data-processing system for calibration of a vehicle surround view system comprising means for carrying out the method of claim 4.

11. A data-processing system for calibration of a vehicle surround view system comprising means for carrying out the method of claim 5.

\* \* \* \* \*